Dec. 27, 1927.
C. RUGGER
1,653,970
CURRENT MOTOR
Filed April 19, 1926    3 Sheets-Sheet 3
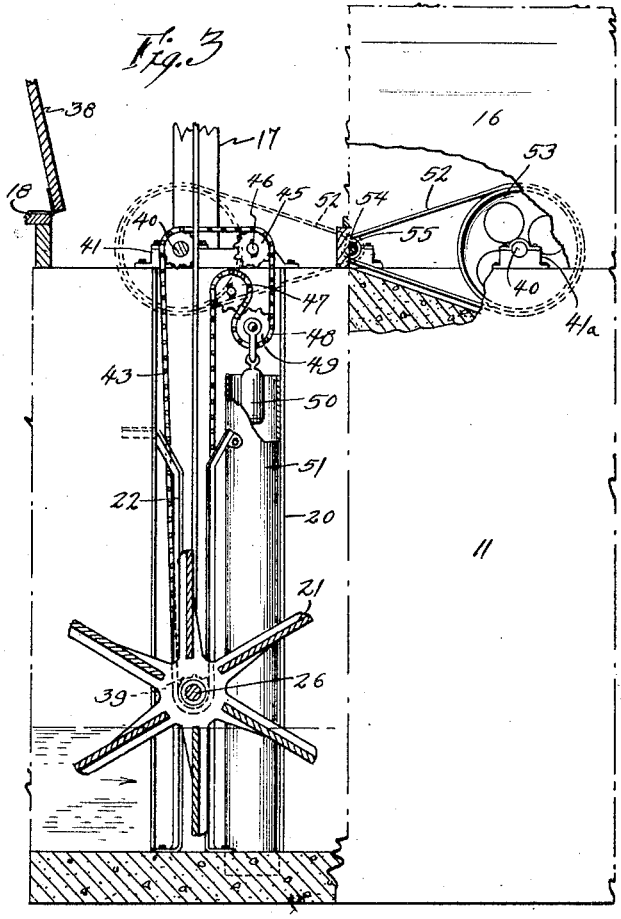
Fig. 3
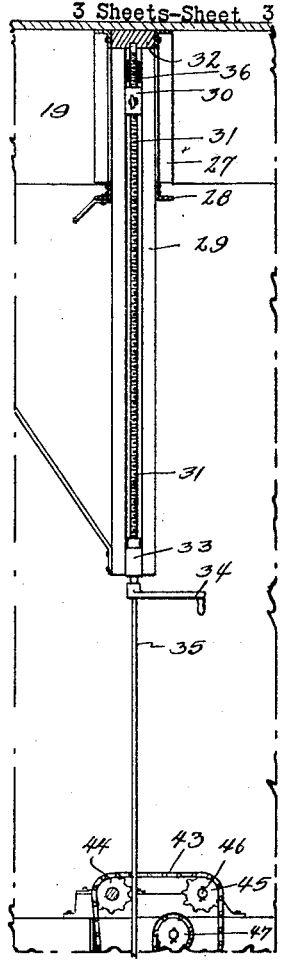
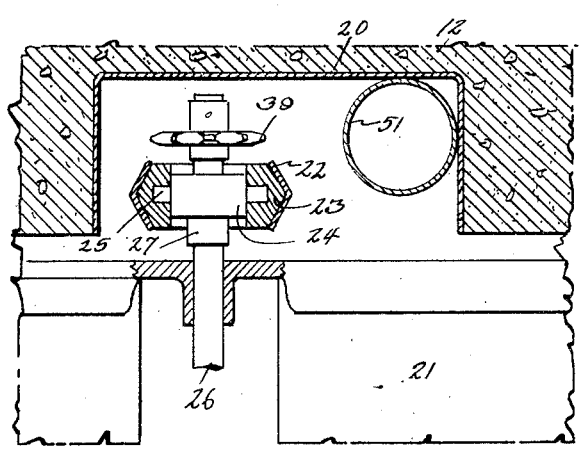
Fig. 5
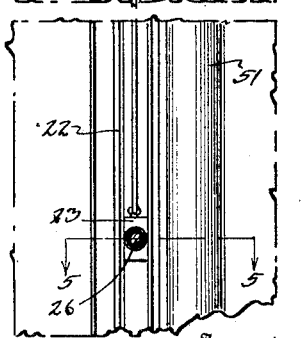
Fig. 4
Inventor
Charles Rugger
By
Lynn A. Latta
Attorney Patented Dec. 27, 1927.

1,653,970

UNITED STATES PATENT OFFICE.

CHARLES RUGGER, OF SIOUX CITY, IOWA.

CURRENT MOTOR.

Application filed April 19, 1926. Serial No. 102,913.

My invention relates to a current motor adapted to be positioned in the midst of a flowing stream and to isolate a portion of the current of the stream in such a manner that it will act upon a water wheel, or a plurality of water wheels geared together to collect power from the current.

It is my object to provide such a device in which the rate of the flow of the water isolated from the remainder of the stream may be boosted by confining it between converging walls.

Another object is to provide such a current motor in which vertical adjustment of the water wheels is provided for in such a way as not to interfere with the gearing mechanism which transmits the power from said wheels to any suitable storage device.

With these and other objects in view, my invention consists in the construction, arrangement and combination of the various parts of my device, whereby the objects contemplated are attained, as hereinafter more fully set forth, pointed out in my claims and illustrated in the accompanying drawings, in which:

Fig. 3 is a detail view, partly in elevation and partly in section, taken as indicated by the line 3—3 of Fig. 1.

Fig. 4 is a detail sectional view, taken as indicated by the line 4—4 of Fig. 2.

Fig. 5 is an enlarged sectional view, taken on the line 5—5 of Fig. 4.

Figure 1:
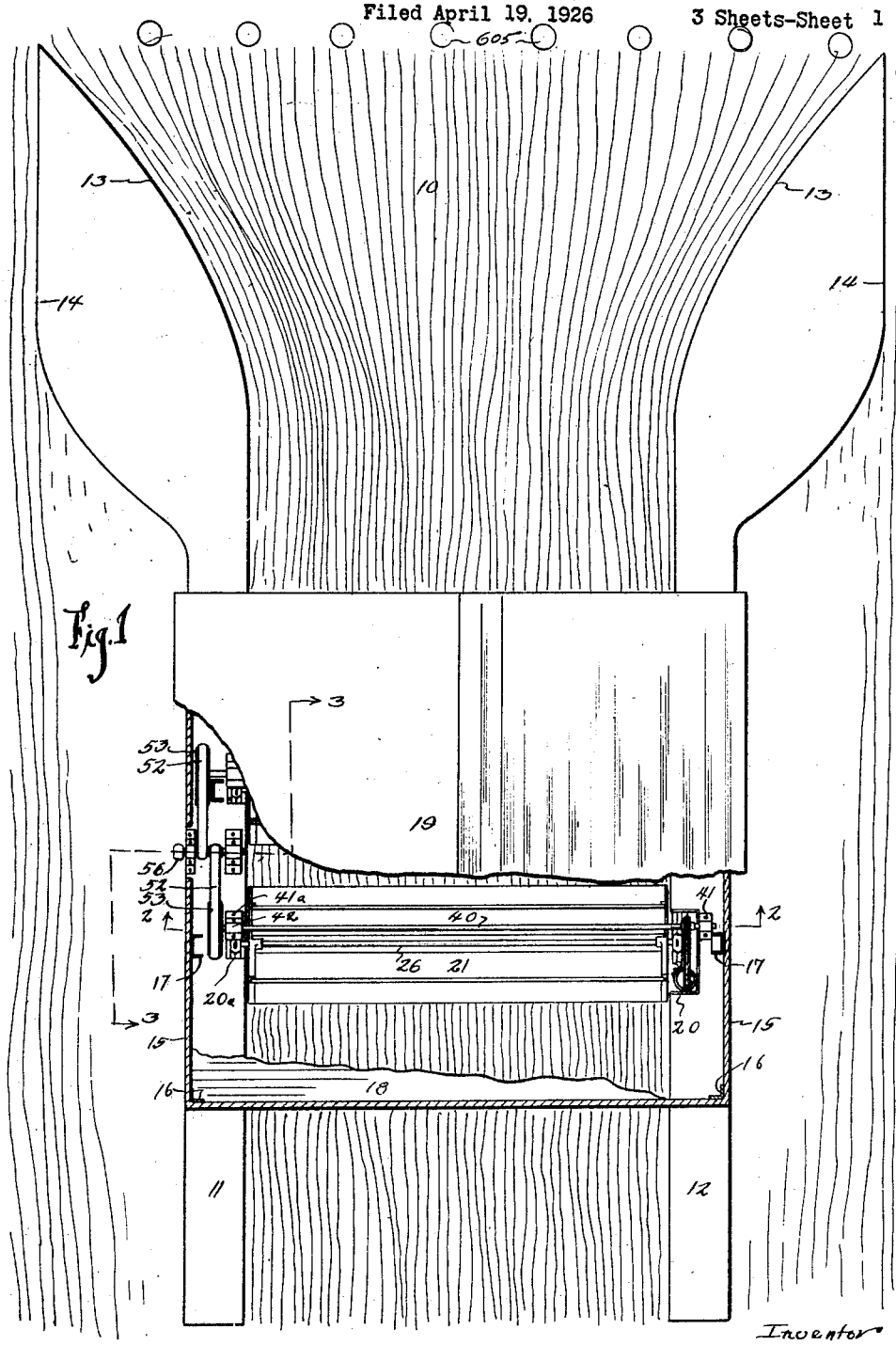
Fig. 1 is a plan view of the current motor, parts being broken away to better illustrate the construction.
Figure 2:
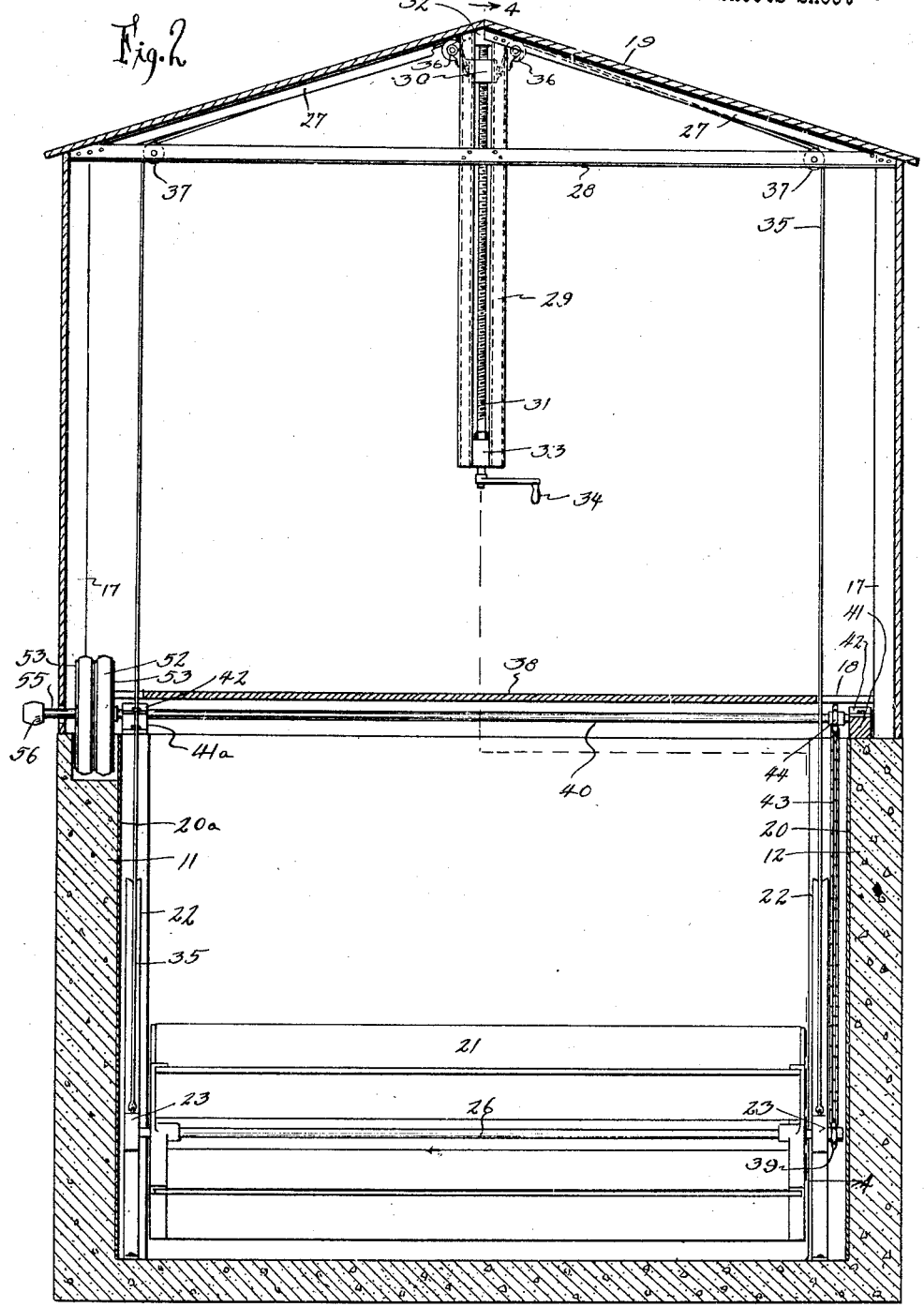
Fig. 2 is a vertical transverse sectional view, taken on the line 2—2 of Fig. 1.

I have used the reference character 10 to indicate generally the current of a flowing stream, in which is positioned the structure of my current motor.

This structure includes generally a pair of side walls, 11 and 12, which are parallel during a majority of their length and flared outwardly at their ends which face the current, as at 13. These forward ends of the wall are preferably thickened so as to provide the straight parallel outer sides, 14, extending rearwardly of the forward extremity for a substantial distance in order to prevent the creating of eddy currents which would retard the flow of a current between the walls. As the current is confined between the narrowing walls its speed will be increased.

I provide a shed structure for the power-receiving mechanism which has the side walls, 15, secured to corner posts, 16, and the intermediate posts, 17, the floor, 18, and the roof, 19.

In the walls, 12 and 11, are a number of vertical channels, 20 and 20ª, respectively, which receive the gearing mechanism of the water wheels, 21. Mounted within the channels, 20, are the guideways, 22. The guideways are open at their upper ends and slidably receive the bearing blocks, 23. (See Figs. 4 and 5.) Bushings, 24, are mounted in the bearing blocks, 23, by means of trunnions, 25, which allow pivotal movement of the bushing on a horizontal axis. The water wheel shafts, 26, are extended through the bushings, 23, and provided with thrust collars, 27, which prevent longitudinal movement of the shafts.

The roof, 19, is supported by a frame structure including the inclined rafters, 27, the horizontal rafters, 28, and the vertical struts, 29. The struts, 29, serve not only as integral portions of the trusses formed with the rafters, but are extended downwardly also to serve as a guideway for an internally threaded sleeve, 30, slidably mounted between the struts.

A threaded shaft, 31, is mounted between a thrust bearing, 32, and a sleeve, 33, in the latter of which it is loosely received and is threaded through the sleeve, 30, so that rotation of the shaft will cause the sleeve to move up or down. A crank, 34, is secured to the lower end of the shaft, 31, to impart rotation thereto.

Cables, 35, are secured to the sleeve, 30, extend over pulleys, 36, secured to the struts, 29, thence over pulleys, 37, secured between the rafters, 28, and thence extend downwardly between the guides, 22, to the bearing blocks, 23, to which they are fastened.

The floor, 18 is apertured above the wheels, 21, so that the wheels may be entirely raised above the floor, and doors, 38, close these apertures.

The shafts, 26, extend entirely through the bearing blocks, 23, within the channels, 20, and those ends of the shafts are provided with drive sprockets, 39.

Power transmitting shafts, 40, are mounted in bearings, 41 and 41ª, having removable bearing caps, 42, and are positioned above and a little to one side of the shafts, 26, in order to not interfere with the cables, 35.

When it is desired to raise the water wheel entirely above the floor, 18, the bearing caps, 42, are removed and the shafts, 40, lifted from position.

Chains, 43, are extended around the drive sprockets, 39, around sprockets, 44, around idler sprockets, 45, mounted on stub shafts, 46, secured in the bearings, 41, and thence over idler sprockets, 47, mounted in the rear walls of the channels, 20, in such a manner as to leave the slack portions, 48.

Riding sprockets, 49, are supported in the bights of the slack portions, 48, and carry weights, 50, sufficient to keep the slack portions taught during various positions of vertical adjustment of the water wheels, 21. In order that the weights, 50, may at no time be affected by the buoyancy of the water, tubes, 51, are secured in vertical positions within the channels, 20, and receive the weights as they are lowered. The tubes, 51, provide water-tight casings for the weights.

Power is transmitted from the shafts, 40, by means of belts, 52, traveling over pulleys, 53, on the shafts, 40, and over pulleys, 54, on a shaft, 55.

A pulley, 56, may be provided on the end of the shaft, 55, to transmit power to any means for restoring energy such as a generating and electrical storage plant.

The advantage of the vertical adjustment of the water wheel is seen when it is considered that the water of the ordinary stream rises and falls in height during the varying seasons. A few turns of the crank will enable the operator of the motor to adjust the wheels to the correct level in order to obtain the fullest efficiency from the flowing current.

Furthermore, should any obstructions flow underneath the water wheel it will lift the wheel rather than break the vanes thereof. In such a case, should one side of the wheel be lifted higher than the other the pivotal mounting of the bushings, 24, will allow the shaft to assume an inclined position without causing the bearing blocks to bind within their guideways.

A number of posts, 60, may be used to prevent large obstructions from entering between the walls, 11 and 12.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a current motor, a flowway, a building covering the same, including a floor provided with an opening, a cover for said opening, a power transmitting shaft located just below said opening and journalled in bearings from which it may be removed upwardly, a water wheel shaft normally positioned below said power transmitting shaft, a water wheel on said water wheel shaft, bearings supporting said water wheel shaft, slideways receiving said bearings, said slideways being open at their upper extremities to allow removal of the water wheel upwardly, and hoisting mechanism supporting the water wheel shaft bearings.

2. In a current motor, a flowway, a building covering the same, including a floor provided with an opening, a cover for said opening, a power transmitting shaft located just below said opening and journalled in bearings from which it may be removed upwardly, a water wheel shaft normally positioned below said power transmitting shaft, a water wheel on said water wheel shaft, bearings supporting said water wheel shaft, slideways receiving said bearings, said slideways being open at their upper extremities to allow removal of the water wheel upwardly, hoisting mechanism supporting the water wheel shaft bearings, aligned driving and driven sprockets on the water wheel shaft and power transmitting shafts, respectively, an idler sprocket positioned laterally from the driver sprocket, a second idler sprocket positioned below and between the first mentioned idler sprocket and the driven sprocket, the chain passing over the driving sprocket, the driven sprocket and the idler sprockets and having a looped portion hanging between the idler sprockets, a weighted, floating sprocket carried in said looped portion and water-tight casing positioned to receive said weighted pulleys upon descent of the same.

Signed at Sioux City, in the county of Woodbury and State of Iowa this 14 day of April, 1926.

CHARLES RUGGER.